United States Patent [19]

Brown

[11] 4,416,397
[45] Nov. 22, 1983

[54] TAMPERPROOF METERING DISPENSER

[76] Inventor: Frank E. Brown, 1741 Camino De Villas, Burbank, Calif. 91501

[21] Appl. No.: 224,620

[22] Filed: Jan. 12, 1981

Related U.S. Application Data

[63] Continuation of Ser. No. 148,780, May 12, 1980, abandoned, which is a continuation of Ser. No. 941,030, Sep. 11, 1978, abandoned.

[51] Int. Cl.$^3$ ............................................. G01F 11/04
[52] U.S. Cl. ..................................................... 222/219
[58] Field of Search ............... 222/217, 218, 219, 249, 222/250

[56] References Cited

U.S. PATENT DOCUMENTS

| | | | |
|---|---|---|---|
| 1,389,834 | 9/1921 | Kraft | 222/219 |
| 1,975,154 | 10/1934 | Jordan | 222/219 |
| 2,054,522 | 9/1936 | Richert | 222/217 |
| 2,292,196 | 8/1942 | Brynoldt | 222/219 |
| 2,427,680 | 9/1947 | Leonard | 222/219 X |
| 3,167,398 | 1/1965 | Whittington | 222/219 X |
| 3,388,839 | 1/1968 | Frydenberg | 222/219 |

Primary Examiner—F. J. Bartuska
Attorney, Agent, or Firm—Christie, Parker & Hale

[57] ABSTRACT

A tamperproof dispenser adapted for attachment to a squeeze tube dispenses a metered amount of material from the squeeze tube. The dispenser includes a body adapted for attachment to the squeeze tube, an inlet passage leading to a hollow valve seat, an outlet passage leading away from the valve seat, a rotor in the valve seat, a passage through the rotor adapted for collinear alignment with the inlet and outlet passages, and a slidable piston in the rotor passage. Material is dispensed by ejecting material from the squeeze tube which forces the piston to move through the rotor passage from adjacent the inlet passage toward the outlet passage. The rotor is rotated after each dispensing cycle to reverse the ends of the rotor passage for re-positioning the piston adjacent the inlet passage in preparation for the next dispensing cycle. The valve seat body has first and second annular peripheral edges surrounding adjacent opposite ends of the rotor. An annular shoulder on the rotor rotatably engages the first peripheral edge of the body. During assembly, a retainer plate is sonically welded to the rotor after the rotor is inserted in the valve seat, for rotatably engaging the second peripheral edge of the body. The annular shoulder and the retainer plate cooperate to retain and seal the rotor inside the valve seat in a tamperproof configuration which also ensures that the material will remain sterile during use.

11 Claims, 15 Drawing Figures

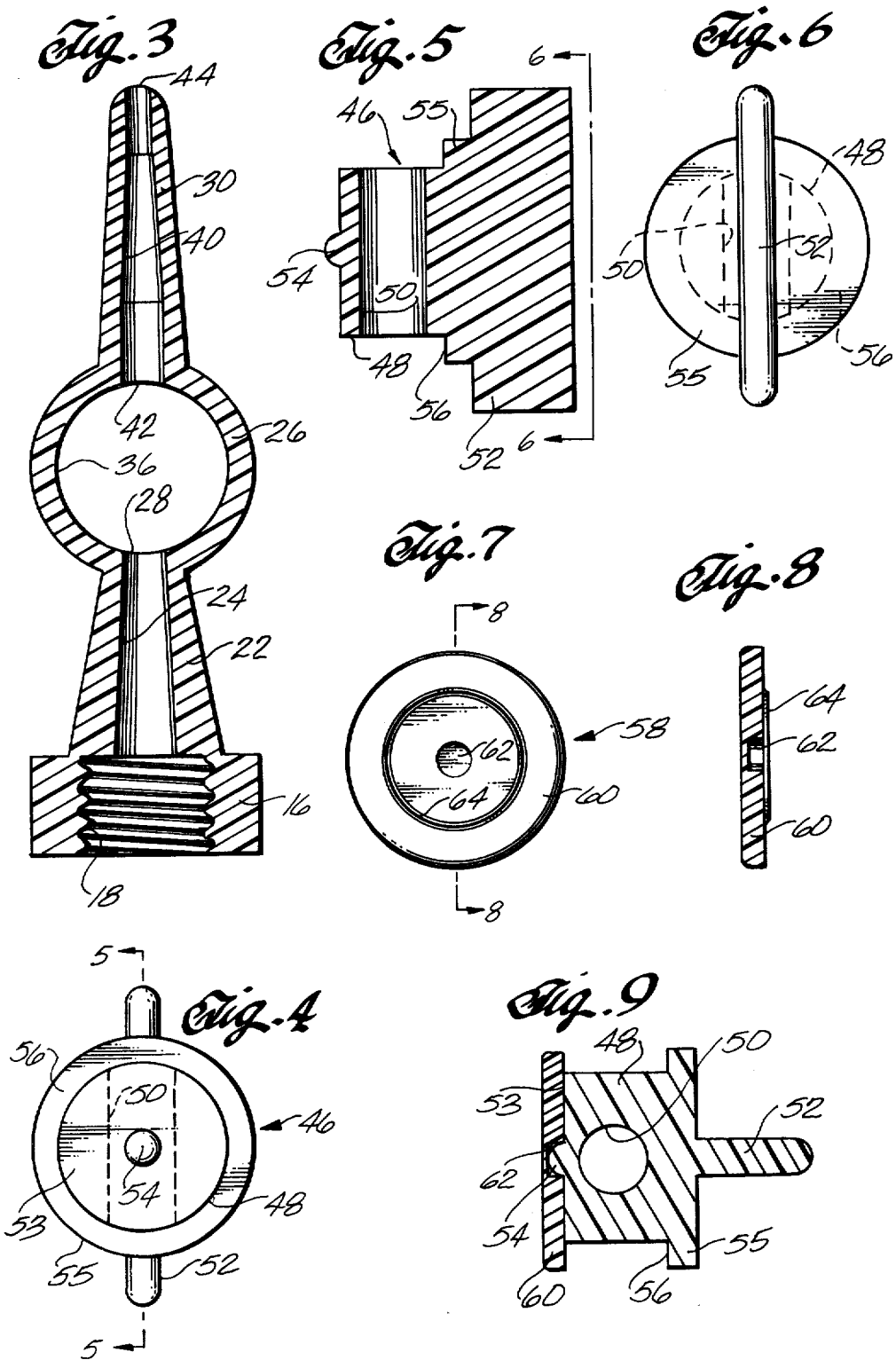

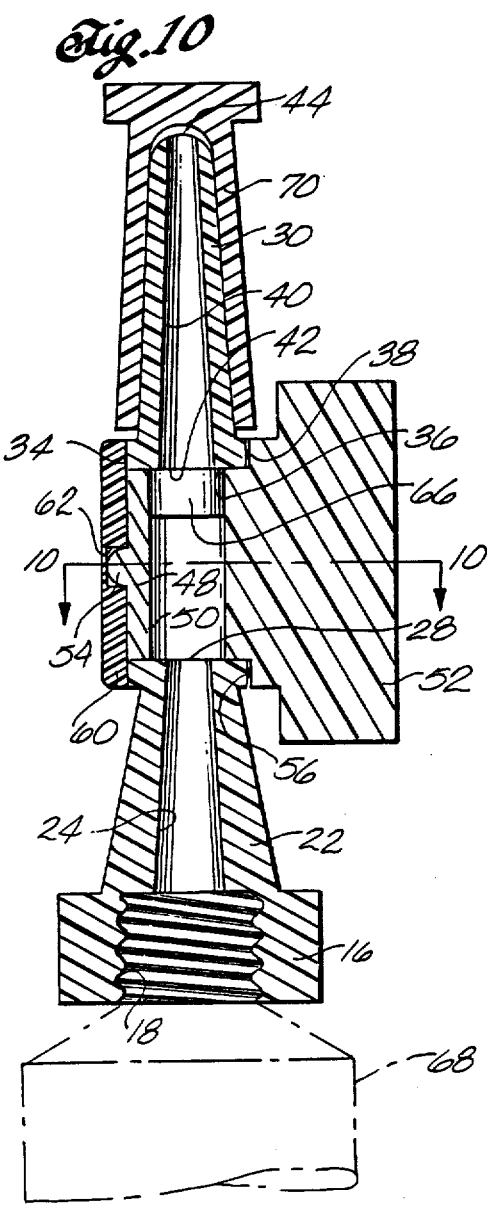
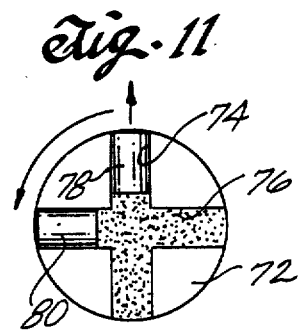
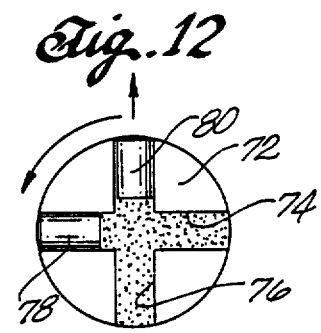
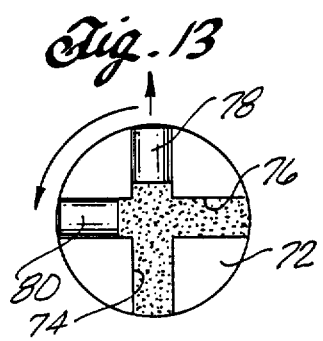
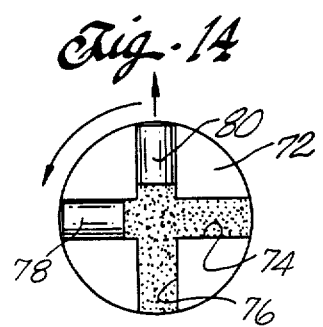
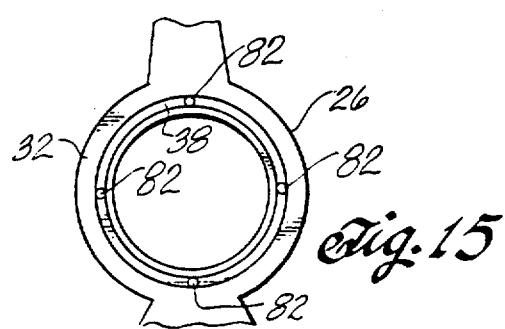

TAMPERPROOF METERING DISPENSER

CROSS REFERENCE TO RELATED APPLICATIONS

This is a continuation of application Ser. No. 148,780, filed May 12, 1980 now abandoned, which, in turn, is a continuation of application Ser. No. 941,030, filed Sept. 11, 1978 now abandoned.

BACKGROUND

This invention relates to a dispenser for measuring and dispensing a metered amount of a product, and more particularly, to a dispenser adapted for attachment to a squeeze tube for dispensing a metered amount of a viscous or semi-fluid material.

The present invention is especially useful in measuring metered amounts of ointments, or other medications used by physicians in treating their patients. A typical need for the present invention is in measuring a specific amount of ointment used in treating a patient's eye after eye surgery. In the past, physicians have used liquid or other free-flowing medications for treating a patient's eye. The medicinal portion of such a liquid solution is diluted and often becomes lost in the patient's eye due to the free-floating characteristic of the liquid. As a result, the physician often has difficulty in precisely controlling the amount of medication which actually comes in contact with the particular portion of the eye being treated. In response to this problem, medication for treating the eye has recently been produced as an ointment in which the medicinal portion is greatly concentrated when compared with liquid medications. The present invention provides a dispenser for measuring and dispensing such highly concentrated medications in extremely accurate dosages.

The dispenser of this invention can be used for home application of ointments by the patient. The dispenser is adapted for attachment to a squeeze tube containing the ointment. The dispenser includes a rotatable valve member having a passage with a slidable piston for controlling the amount of ointment dispensed by the patient. In response to pressure applied to the squeeze tube, the piston slides in the passage in the valve member to dispense a metered amount of ointment. The fixed size of the piston ensures that the patient will dispense the required dosage each time. The physician simply selects the particular dispenser configuration that will dispense the required dosage. After the ointment is dispensed the valve member is rotated to re-position the piston for the next dispensing cycle. Inasmuch as the dispenser can be used for self-treatment by a patient, it is desirable that the rotatable valve member be non-removably sealed in the dispenser body so the physician can be confident that the dispenser cannot be taken apart and the fixed dosage tampered with and that the ointment will remain sterile throughout its use.

SUMMARY OF THE INVENTION

The present invention provides a tamperproof dispenser for measuring and dispensing an accurately metered amount of a material. The dispenser is faultless in repetitively dispensing a selected dosage during each dispensing cycle. A rotatable valve member in the dispenser is completely sealed within the dispenser body so that ointments being dispensed can remain sterile throughout use and the valve member cannot be removed or the metered dosage changed during use.

Briefly, the dispenser includes a body having an inlet passage for receiving and containing a material to be dispensed, an outlet passage for containing and dispensing a metered amount of the material, and a valve seat between the inlet and outlet passages. The valve seat has a first opening from the inlet passage and a second opening to the outlet passage. A rotatable valve member in the valve seat has a passage extending through it. A piston is movable in the valve passage from relatively nearer the first opening to relatively nearer the second opening in response to pressure from a viscous material entering the valve passage from the first opening. Movement of the piston in the valve passage applies pressure to material in the outlet passage to dispense the material from the dispenser. By rotating the valve member, the piston can be moved from relatively nearer the second opening to relatively nearer the first opening to repeat the dispensing cycle. A first exterior annular peripheral edge surrounds one end of the valve seat body and a second exterior annular peripheral edge surrounds an opposite end of the valve seat body. The valve member has an annular shoulder engaged with the first peripheral edge of the valve seat body. A retainer plate is fused to the valve member and rotatably engages the second peripheral edge of the valve seat body. The annular shoulder and the retainer plate cooperate to retain and seal the rotatable valve member within the valve seat. In one embodiment of the invention, the retainer plate is sonically welded to a face of the valve member opposite the annular shoulder.

In one form of the invention, the valve member has a first passage extending through it and a second passage extending through it and intersecting the first passage. A first piston is slidable in the first passage and a second piston is slidable in the second passage. Each piston is sufficiently short in length to permit passage of dispensed material across the intersection of the two passages, and the length of each piston is greater than the width of the passage containing the other piston. Thus, by rotating the valve member in one direction the first and second passages can be alternately aligned with the inlet and outlet passages, and in each alignment, either the first or the second piston will be in position for dispensing material. This allows the valve member to be rotated in increments and multiple dosages dispensed within less than a complete revolution of the valve member.

These and other aspects of the invention will be more fully understood by referring to the following detailed description and the accompanying drawings.

DRAWINGS

FIG. 3 is a cross-sectional view taken on line 3—3 of FIG. 2;

FIG. 4 is an end elevation view showing a rotatable valve member adapted for engagement with the dispenser body;

FIG. 5 is a cross-sectional view taken on line 5—5 of FIG. 4;

FIG. 6 is an end elevation view taken on line 6—6 of FIG. 5;

FIG. 7 is an elevation view showing a retainer plate for retaining the valve member in the dispenser body;

FIG. 8 is a cross-sectional view taken on line 8—8 of FIG. 7;

FIG. 9 is a cross-sectional view showing taken on line 9—9 of FIG. 10;

FIG. 10 is a cross-sectional view showing an assembled dispenser;

FIGS. 11 through 14 are semi-schematic elevation views showing an alternative form of the rotatable valve member at consecutive 90 degree rotational orientations with respect to the dispenser body; and FIG. 15 is a fragmentary elevation view showing an alternative form of the dispenser body with indexing means for use with the valve member of FIGS. 11 through 14.

DETAILED DESCRIPTION

The present invention relates to a dispenser adapted to be releasably secured to the tip of a squeeze tube. The squeeze tube contains a product to be measured and dispensed in metered amounts by the dispenser of this invention. The dispenser is useful in dispensing plastic or pliable semi-fluid or viscous materials commonly contained in such squeeze tubes. Typical examples of such materials are medical salves or ointments. The dispenser is especially useful in measuring and dispensing dosages of highly concentrated medical ointments in which an accurate measurement of each dosage is desirable.

Figure 1:
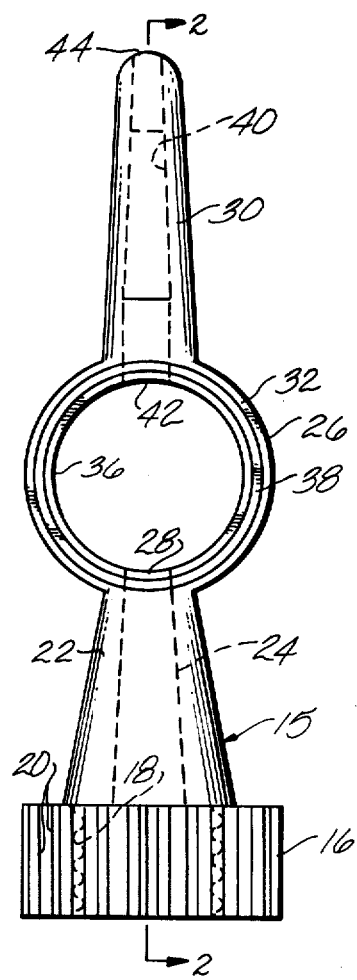
FIG. 1 is a front elevation view showing the body of a dispenser according to principles of this invention.
Figure 2:
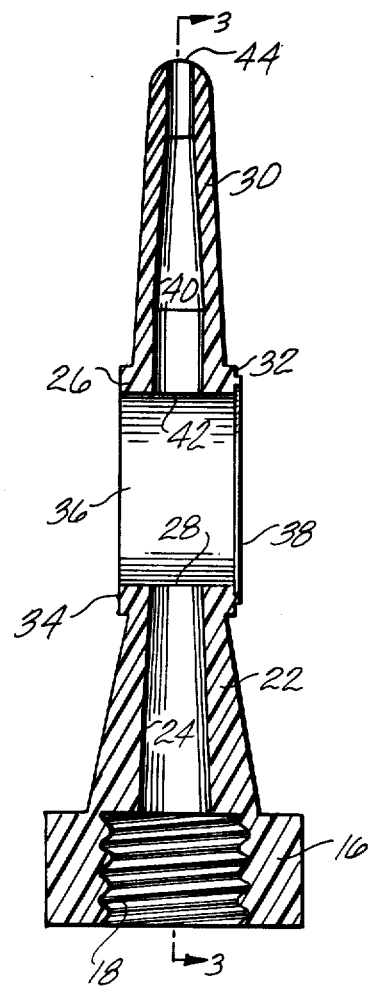
FIG. 2 is a cross-sectional view taken on line 2—2 of FIG. 1.

FIGS. 1 through 3 illustrate a dispenser body 15 adapted for attachment to a squeeze tube. The body 15 is circular in cross-section and includes an enlarged cylindrical inlet end 16 having an internally threaded inlet passage 18 for being threaded onto a cooperating externally threaded neck of a squeeze tube. The cylindrical inlet end 16 of the dispenser body has mutually spaced apart, longitudinally extending parallel ridges 20 or the like to facilitate gripping the inlet end of the dispenser when threading it onto the end of a squeeze tube.

The dispenser body generally tapers narrower away from the inlet end 16 to form a tapered, elongated, tubular inlet section 22 having a slightly tapered inlet passage 24 (also referred to as a product-receiving passage) extending away from the threaded inlet passage 18 in the inlet end of the dispenser body. The inlet passage 24 is a straight, smooth-surfaced passage which is circular in transverse cross-section. The inlet passage tapers slightly narrower toward an enlarged intermediate region of the dispenser body which forms a valve seat region 26 for containing a rotary valve member described below. The inlet passage 24 has a first opening 28 at its end which opens into the enlarged valve seat region 26 of the dispenser body. The valve seat region 26 provides a valve seat for a rotatable valve member (described below) between the inlet section 22 of the dispenser and an outlet section 30 of the dispenser on a side of the valve seat opposite the inlet section.

The valve seat region 28 is cylindrical in shape and is enlarged relative to the respective inlet and outlet sections 22 and 30 on opposite sides of it. The valve seat region is formed as a receptacle having a first annular exterior peripheral edge 32 and a second annular exterior peripheral edge 34 at opposite ends of a cylindrical bore 36 extending through the valve seat region. The axis of the valve seat bore 36 is perpendicular to the longitudinal axis through the inlet and outlet passages of the dispenser body. The first annular peripheral edge 32 faces away from one end of the cylindrical bore 36 and is in a plane generally parallel to the longitudinal axis through the dispenser body. Likewise, the second peripheral edge 34 faces away from the opposite end of the bore 36 and is also parallel to the longitudinal axis through the dispenser body. A thin, circular bead 38 projects away from the annular face of the first exterior peripheral edge 32 so that the bead surrounds one end of the bore 36 through the valve seat 26.

The outlet section 30 of the dispenser body is shaped as a narrow, elongated, tapered tubular section having a narrow smooth-surfaced elongated outlet passage 40 (also referred to as a product-dispensing passage) extending through it. The outlet passage extends from a second opening 42 in the valve seat region to an outlet opening 44 at the tip of the outlet section.

Referring to FIGS. 4 through 6, a rotatable valve member 46 is adapted to be rotatably seated in the valve seat region of the dispenser body. The valve member has a section shaped as a cylindrical rotor 48 having an elongated, smooth-surfaced straight valve passage 50 surfaced straight valve-containing passage 50 extending through the rotor. The valve passage opens through opposite sides of the rotor side wall and extends through the central axis of the rotor. One end of the rotor has a narrow flat tab 52 projecting away from the rotor to facilitate turning the rotor about its axis. When the rotor is seated in the valve seat region, the axis of the rotor extends perpendicularly to the longitudinal axis through the inlet and outlet passages 24, 40, respectively, of the dispenser body. The rotor 48 has a flat outside face 53 on a side of the rotor opposite the tab 52. An outwardly projecting boss 54 is formed on the flat outside face of the rotor. The boss 54 is coincident with the rotational axis of the rotor body 48. The tab 52 is secured to an enlarged cylindrical section 55 of the rotor on a side of the rotor opposite the outside face 53. The enlarged cylindrical section 55 forms an annular shoulder 56 facing toward the rotor body 48 and the outside face 53. The annular shoulder 56 is parallel to the axis through the valve passage 50.

FIGS. 7 and 8 show a retainer plate 58 used in retaining the rotor 46 inside the valve seat 26 when the dispenser is assembled, as shown in FIG. 9. The retainer plate is a flat circular disc having a diameter greater than the outside diameter of the rotor body 48 and greater than the inside diameter of the cylindrical valve seat 36. Preferably the diameter of the disc 60 is about the same as the outside diameter of the second peripheral edge 34 surrounding the valve seat. A circular recess 62 is formed in the center of the disc 60. The inside diameter of the circular recess matches the diameter of the circular boss 54 on the valve rotor 46. A thin, circular weld bead 64 projects from the same surface of the disc in which the recess is formed. The circular weld bead 64 is concentric with the axis of the circular recess. The diameter of the bead 64 is less than the outside diameter of the rotor body 48 so that the circular bead can contact the outside face 53 of the rotor body 48.

FIG. 9 shows the dispenser in its assembled form, in which the rotatable valve 46 is positioned in the valve seat region 26 of the dispenser body. The dispenser is assembled by first slipping the cylindrical body 48 of the rotor into the cylindrical bore 36 of the valve seat. The rotor body has a smooth exterior surface which makes a snug fit with the surrounding interior surface of the valve seat. The rotor body 48 is seated so that the annular shoulder 56 of the rotor overlaps and engages the circular bead 38 on the first peripheral edge 32 surrounding the valve seat. This provides a rotatable ring seal between that one end of the valve seat and the rotor. When the rotor is seated in the valve seat, the outside face of the rotor body is aligned generally in the plane of the second peripheral edge 34 surrounding the opposite end of the valve seat. The retainer plate is then placed over the opposite face of the rotor by slipping the central recess 62 of the retainer plate over the boss 54 projecting from the outside face of the rotor. This centers the retainer plate with respect to the axis of the rotor body 48 and positions the circular weld bead 64 so that it engages the outside face of the rotor body. The disc is then integrally formed with the rotor body, preferably by sonic welding techniques, in which a sonic horn (not shown) is placed adjacent the disc and activated to generate sufficient heat to fuse the bead 64 to the face of the rotor and thereby weld the disc to the outside face of the rotor. The disc and rotor are shown welded together in FIGS. 9 and 10. The retainer plate overlaps and rotatably engages the second peripheral edge surrounding the valve seat, while the opposite first peripheral edge of the valve seat is sealably engaged with the annular shoulder 56 on the rotor. This locks the rotor inside the valve seat in a tamperproof configuration so that the rotor cannot be removed from the dispenser. Moreover, this configuration provides seals at opposite ends of the valve seat to ensure that material used in the dispenser can be maintained completely sterile during use of the dispenser.

The sonic weld also facilitates ease of assembly and more reliable operation of the dispenser during use, when compared with a rotor which is press-fitted into a valve seat past an annular shoulder of flange which then must overlap and confine one end of the rotor within the valve seat. Such a flange or shoulder must be deformed during assembly to allow the rotor to be forced through it. The previously deformed flange then must overlap the rotor sufficiently to provide a seal at one end of the rotor during use. Such deformation during assembly can cause the flange or shoulder to fracture and cause subsequent leakage during use. In contrast, the sonically welded plate of this invention allows the rotor to be inserted in the valve seat without any deformation during assembly, and after the plate is welded it provides a much superior end seal when compared with a previously deformed flange or shoulder. Moreover, the present invention permits use of a more reliable hard plastic material, such as hard polystyrene, for the dispenser body since the dispenser body need not be deformed during assembly.

During use, rotation of the rotor aligns the valve passage 50 with the product-receiving passage 24 and the product-dispensing passage 40 of the dispenser body. By rotating the rotor through 180° intervals, the passage 50 can be moved into collinear alignment with the product-receiving and product-dispensing passages during each 180° rotation.

Referring to FIG. 9, an elongated cylindrical piston or valve 66 is slidably disposed in the valve passage 60 through the rotor. The piston makes a snug fit inside the passage. The passage is of the same inside diameter from end-to-end to enable the piston to slide from one end to the other of the passage under pressure exerted on the piston. The piston is sufficiently free floating in the passage so that it slides through the passage under a moderate amount of fluid pressure from a semi-fluid or viscous material in the passage, without any appreciable leakage or bypassing of the material between the piston and the inside wall of the passage.

FIG. 9 shows the position of the piston 66 in the valve passage 50 after a metered amount of material has been dispensed by the dispenser. The rotor body 48 is rotatable so that its passage 50 can be aligned longitudinally with the product-receiving and product-dispensing passages and the piston can be positioned at the bottom of the passage 50 (with reference to FIG. 9) immediately adjacent the inlet opening 28 from the product-receiving passage. The dispenser is initially primed with material from a squeeze tube 68 secured to the lower inlet portion 16 of the dispenser. The dispenser is primed so that a sufficient amount of the material occupies (1) the product-receiving passage between the tip of the squeeze tube and the inlet opening 28, (2) the rotor passage 50 between the end of the piston 64 and the entrance opening 42 to the product-dispensing passage, and (3) the entire product-dispensing passage 40. Thereafter, the squeeze tube is squeezed to expel a viscous material from the tube and force it in the direction toward the piston 66. The squeeze tube is sealed to the dispenser so that the material expelled from the squeeze tube applies fluid pressure to the piston, which slides the piston longitudinally through the rotor passage 50 toward the opening 42 to the product-dispensing passage 40. The piston slides to the opposite end of the rotor passage under continued pressure from the material squeezed from the squeeze tube, which, in turn, applies corresponding pressure to the viscous material in the product-dispensing passage. This pressure dispenses a metered amount of material from the outlet end 44 of the product-dispensing passage.

When the piston reaches the position shown in FIG. 10, the metered amount of material has been dispensed and the dispensing cycle is completed. To dispense the next metered amount, the rotor is rotated on it axis by gripping the rotor tab 52 and turning it 180° so that the ends of the rotor passage are reversed. This aligns the rotor passage with the product-receiving passage and the product-dispensing passage, and moves the piston from the position shown in FIG. 9 to a position adjacent the inlet opening 28 of the product-receiving passage. Since an amount of material was forced under pressure into the rotor passage behind the piston during the dispensing cycle, the 180° rotation of the rotor also positions in front of the piston the material which was forced into the rotor passage behind the piston during the previous dispensing cycle. Thus, each 180° rotation of the rotor positions the piston in front of a filled portion of the rotor passage and a filled product-dispensing passage in preparation for dispensing the next metered amount of material from the dispenser.

The passage 54 through the rotor, together with the piston 66, are slightly oversized in diameter relative to the inside diameter of the product-receiving and product-dispensing passages 24, 40, respectively. Travel of the piston to the end of the rotor passage adjacent the opening 42 causes the piston to come into contact with the interior portion of the dispenser valve seat region 36 which surrounds the opening 42. This acts as a stop to ensure that movement of the piston is only within the confines of the rotor, and ensures a faultless measurement of the dispensed material during each dispensing cycle.

FIG. 9 also shows an end cap 70 which makes a slip fit over the discharge end 40 of the dispenser when the dispenser is not in use.

FIGS. 11 through 14 schematically depict an alternative form of the invention in which the rotor body 72 has a first passage 74 and a second passage 76 intersecting the first passage, preferably at a right angle. A first piston 78 is slidably disposed in the first passage, and a second piston 80 is slidably disposed in the second passage. The first piston 78 is longer than the diameter of the second passage 76 and the second piston 80 is longer than the diameter of the first passage 74. Each piston also is sufficiently short in length to unblock the intersection between the two passages when each piston is at the end of its corresponding passage.

The arrangement shown in FIGS. 11 through 14 allows the rotor to be rotated in one direction so that the first and second passages can be alternately aligned with the product-receiving and product-dispensing passages of the dispenser. In each alignment either the first or the second piston will be in position for dispensing a metered amount of material when pressure is applied to the squeeze tube 68. Thus, the rotor can be rotated in increments and multiple dosages dispensed within less than a complete revolution of the valve member. In the embodiment shown, the rotor can be incrementally moved to four separate positions, 90° apart, for dispensing four separate doses during each 360° rotation of the rotor. FIGS. 11 to 14 show the position of the pistons after each dispensing cycle. After the first dispensing cycle shown in FIG. 11, the second piston 80 is positioned so that upon a subsequent 90° rotation of the rotor 72, the second piston 80 will be in position to dispense the next metered amount. FIG. 12 shows the second piston after the second dispensing cycle, in which the first piston 78 is now in position for dispensing a metered dosage following the next 90° of rotation. FIG. 13 shows the first piston after the third dispensing cycle, in which the second piston 80 is again in position for dispensing the next metered amount following the next 90° of rotation. FIG. 14 shows the second piston 80 following the fourth dispensing cycle.

FIG. 15 shows indexing means which can be used with the rotor of FIGS. 11 through 14 for accurately positioning the first passage or the second passage with the material-receiving and material-discharge passages of the dispenser. The indexing means include four circumferentially spaced apart small recesses 82 formed in the bead 38 surrounding the first annular peripheral edge 32 of the valve seat 26. A detent (not shown) projecting from the shoulder 56 of the rotor clicks into position with each recess 82 when either the first or the second passage is aligned with the passages in the dispenser.

Thus, the present invention provides a dispenser which can be secured to the end of a squeeze tube, and by simply squeezing the squeeze tube, the dispenser can dispense and measure a metered amount of product faultlessly during each dispensing cycle. The dispenser facilitates safe patient self-treatment since the tamperproof configuration ensures that the same accurately metered amount of medication will be dispensed each time, and the sealed dispenser ensures that such medications will remain sterile during use of the dispenser.

What is claimed is:

1. A tamperproof dispenser comprising:
   a body having an inlet passage for receiving and containing a material to be dispensed, an outlet passage for containing and dispensing a metered amount of the material, a valve seat between the inlet and the outlet passage, the valve seat having a first opening from the inlet passage and a second opening to the outlet passage, a first annular peripheral edge on one side of the valve seat, and a second annular peripheral edge on an opposite side of the valve seat;
   a rotatable valve member disposed in the valve seat, the valve member having a valve passage extending through it for alignment with the inlet and outlet passages, and an annular shoulder engaging the first peripheral edge of the valve seat;
   a rotatable valve member disposed in the valve seat, the valve member having a valve passage extending through it for alignment with the inlet and outlet passages, and annular shoulder engaging the first peripheral edge of the valve seat;
   a piston movable in the valve passage from relatively nearer the first opening to relatively nearer the second opening in response to pressure from material entering the valve passage from the first opening, the movement of the piston in the passage forcing a preselected amount of material in the outlet passage to be dispensed, a second material transfer passage extending through the valve member and intersecting the other material transfer passage, and a second piston in the second material transfer passage;
   a retainer plate fused to a face of the valve member opposite the annular shoulder and rotatably engaging the second peripheral edge of the valve seat for cooperating with the annular shoulder of the valve member to rotatably confine and seal the valve member within the valve seat in a tamperproof configuration preventing removal of the valve member from the valve body; and
   means for rotating the valve member for aligning the valve passage with the inlet and outlet passages for moving the piston from relatively nearer the second opening to relatively nearer the first opening.

2. Apparatus according to claim 1 including a seal ring formed between the first peripheral edge of the valve seat and the annular shoulder of the valve member.

3. Apparatus according to claim 1 wherein the means for rotating the valve member comprises a tab projecting from a side of the valve member opposite the retainer plate.

4. Apparatus according to claim 3 in which the retainer plate is fused to a face of the valve member opposite the annular shoulder.

5. Apparatus according to claim 3 including an interlocking shoulder and socket between a face of the valve member opposite the tab and an inside surface of the retainer plate.

6. Apparatus according to claim 5 wherein the interlocking shoulder and socket comprises a boss projecting from the center of the valve member and engaged in a recess in the center of the retainer plate.

7. Apparatus according to claim 1 wherein each piston is sufficiently short to unblock passage across the intersection of the two passages.

8. Apparatus according to claim 7 wherein the length of each piston is greater than the width of the passage containing the other piston.

9. Apparatus according to claim 1 including detent means for indexing rotational movement of the valve member.

10. A dispenser comprising:
- a body having an inlet passage for receiving and containing material to be dispensed, an outlet passage for containing and dispensing a metered amount of the material, and a valve seat between the inlet and outlet passages, the valve seat having a first opening from the inlet passage and a second opening to the outlet passage;
- a rotatable valve member disposed in the valve seat, the valve member having a first passage extending through it and a second passage extending through it and intersecting the first passage; and
- a first piston in the first passage, and a second piston in the second passage, each piston being movable in its corresponding passage from relatively nearer the first opening to relatively nearer the second opening when such passage is aligned with the inlet and outlet passages, each piston being sufficiently short in length to unblock passage across the intersection of the two passages, the length of each piston being greater than the width of the passage containing the other piston.

11. Apparatus according to claim 10 including detent means for indexing rotational movement of the valve member.

* * * * *